United States Patent [19]

Dusoleil et al.

[11] Patent Number: 4,882,376
[45] Date of Patent: Nov. 21, 1989

[54] PLASTISOLS BASED ON VINYL CHLORIDE POLYMERS, AND USE OF PLASTISOLS FOR COATING SHEET METAL

[75] Inventors: Serge Dusoleil, Brussels; Jean-Luc Preat, Grimbergen; Odon Barthelemy, Brussels, all of Belgium

[73] Assignee: Solvay & Cie, Belgium

[21] Appl. No.: 339,880

[22] Filed: Apr. 18, 1989

Related U.S. Application Data

[63] Continuation of Ser. No. 146,105, Jan. 20, 1988, abandoned.

[30] Foreign Application Priority Data

Jan. 22, 1987 [FR] France ............................... 8700836

[51] Int. Cl.$^4$ ............................................. C08K 5/42
[52] U.S. Cl. .................................... 524/166; 524/157; 526/214
[58] Field of Search ................. 524/157, 166; 526/214

[56] References Cited

U.S. PATENT DOCUMENTS 3,329,640  7/1967  Scotti ................................. 524/157
3,736,282  5/1973  Fetter ................................. 526/214

FOREIGN PATENT DOCUMENTS 1566010  4/1980  United Kingdom .

Primary Examiner—Christopher Henderson
Attorney, Agent, or Firm—Stevens, Davis, Miller & Mosher

[57] ABSTRACT

The vinyl chloride polymers forming part of the composition of the plastisols result from the polymerization of vinyl chloride in aqueous medium with the aid of sulphosuccinamate(s). After gelling at 120°–140° C., the plastisols based on such polymers have an excellent adhesiveness to metal. They are more particularly suitable for coating sheet metal processed by electrostatic spraying.

6 Claims, No Drawings

PLASTISOLS BASED ON VINYL CHLORIDE POLYMERS, AND USE OF PLASTISOLS FOR COATING SHEET METAL

This application is a continuation of application Ser. No. 146,105, filed Jan. 20, 1988 now abandoned.

FIELD OF THE INVENTION

The present invention relates to plastisols based on vinyl chloride polymers. It relates more particularly to plastisols based on vinyl chloride polymers whose gel temperature is lowered and whose adhesiveness to metal after gelling is improved. The invention also relates to the use of these plastisols for coating sheet metal processed by electrostatic spraying.

BACKGROUND OF THE INVENTION

Plastisols or pastes based on vinyl chloride polymers, which are dispersions of vinyl chlorides polymers in the form of fine particles in one or more plasticizers, find many outlets, especially in the field of the coating of various metal objects with a view of protecting them against corrosion and/or abrasion.

To prepare such plastisols it is usual to resort to polyvinyl chlorides produced by aqueous emulsion polymerization with the use of conventional emulsifying agents of the soap type (alkali, alkaline-earth or ammonium salts of fatty acids). The plastisols prepared from such polyvinyl chlorides are suitable for formulating compounds capable of gelling at 160°–180° C. and adhering to metal. Nevertheless, there is an increasing demand, especially among motor vehicle manufacturers, for plastisols capable of gelling at lower temperatures. When the abovementioned plastisols of the prior art are gelled at temperatures of the order of 140° C., their adhesiveness to metal becomes paltry, and in practice this makes them unusable under such conditions of application.

The aim of the present invention is to provide plastisols based on vinyl chloride polymers which are capable of gelling at reduced temperature and which adhere perfectly to metal after gelling.

SUMMARY OF THE INVENTION

As characterized in the claims, the invention provides plastisols based on vinyl chloride polymers, referred to briefly hereinafter by the term "plastisols", capable of gelling at 120°–140° C. and which, after gelling, have an adhesiveness to metal processed by electrostatic spraying of at least 2 MPa, and generally higher than 2.5 MPa.

DETAILED DESCRIPTION OF THE INVENTION

The essence of the invention lies in the resort to one or more alkali metal or ammonium sulphosuccinamates as emulsifying agent(s) in the manufacture of the vinyl chloride polymers forming part of the composition of the plastisols according to the invention.

Alkali metal or ammonium sulphosuccinamates are intended to denote the emulsifying products corresponding to the general formula:

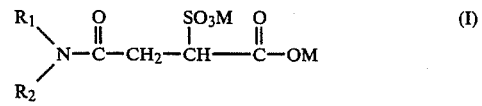

in which:
R$_1$ and R$_2$ denote a hydrogen atom, a C$_8$–C$_{32}$ alkyl radical or an alkali metal or ammonium 1,2-dicarboxyethyl radical, with R$_1$ and R$_2$ being incapable of denoting a hydrogen atom simultaneously, and
M denotes an alkali metal or an ammonium group.

Preferred sulphosuccinamates are those corresponding to the general formula (I) in which:
R$_1$ denotes a C$_{16}$–C$_{20}$ alkyl radical,
R$_2$ denotes a hydrogen atom or an alkali metal 1,2-dicarboxyethyl radical, and
M denotes an alkali metal.

Very particularly preferred sulphosuccinamates are those defined above, in which:
R$_2$ denotes a sodium 1,2-dicarboxyethyl radical, and
M denotes sodium.

These sulphosuccinamates correspond, therefore, to the general formula:

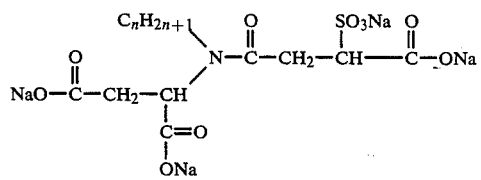

in which n denotes an integer ranging from 16 to 20.

The way in which the vinyl chloride polymers forming part of the composition of the plastisols according to the invention are produced is not critical. These polymers may therefore be manufactured by any methods of polymerization in aqueous medium in which the monomers are dispersed in the form of fine droplets in an aqueous phase by means of an emulsifying agent. In particular, aqueous emulsion polymerization and aqueous microsuspension polymerization, also known as homogenized aqueous dispersion polymerization, are therefore suitable.

Any water-soluble radical polymerization initiator may be employed in the aqueous emulsion polymerization; in the aqueous microsuspension polymerization, any oil-soluble radical polymerization initiator may be employed. In both cases it is essential to carry out the polymerization with the aid of one or more alkali metal or ammonium sulphosuccinamates. A conventional emulsifying agent may, of course, be combined with the sulphosuccinamate. Nevertheless, preference is given to vinyl chloride polymers produced with the aid of one or more sulphosuccinamates as the only emulsifying agent(s).

The quantity of sulphosuccinamate employed in the polymerization is not critical and may vary quite widely. Usually, from 0.5 to 3 parts and, preferably, from 0.75 to 1.50 parts by weight of emulsifying agent are employed in all per 100 parts by weight of monomer(s). Furthermore, the sulphosuccinamate may be introduced into the polymerization medium all together or in part at the beginning or in the course of polymerization.

In addition to one or more emulsifying agents comprising at least one sulphosuccinamate and water- or oil-soluble initiators, depending on the case, the polymerization medium may contain various additives which are usually employed in conventional emulsion or aqueous microsuspension polymerization processes. By way of examples of such additives there may be mentioned buffers, particle size regulators or polymer molecular weight regulators, stabilizers, colorants, and the like.

The general operating conditions for the manufacture of vinyl chloride polymers forming part of the composition of the plastisols according to the invention do not differ from those usually employed. The temperature is generally between 35° and 80° C. The absolute pressure is generally below 15 kg/cm$^2$. The pH is generally basic, for example between 5 and 10. The quantity of water which is employed is generally such that the total weight of the monomers represents 20 to 50% of the total weight of water and of the monomers.

The vinyl chloride polymers are, furthermore, isolated from their polymerization medium in a conventional manner by spray drying and are then milled so as to produce particles whose volume mean diameter is approximately between 5 and 20 μm.

Vinyl chloride polymers are intended to denote both homopolymers and copolymers of vinyl chloride containing at least 80% by weight of vinyl chloride and mixtures of these. By way of examples of comonomers which can be employed there may be mentioned vinyl esters derived from saturated $C_2$-$C_4$ aliphatic acids, such as vinyl acetate, and acrylic esters derived from saturated $C_2$-$C_{10}$ aliphatic alcohols, such as 2-ethylhexyl acrylate. The preferred polymers of vinyl chloride are chosen from vinyl chloride homopolymers and vinyl chloride copolymers containing from 92 to 98% by weight of vinyl chloride, the remainder consisting of vinyl acetate and/or 2-ethylhexyl acrylate.

Vinyl chloride polymerization is thus intended to denote both the homopolymerization of vinyl chloride and its copolymerization with other copolymerizable monomers which are present in a proportion of not more than 20%, such as vinyl esters derived from saturated $C_2$-$C_4$ aliphatic acids and acrylic esters derived from saturated $C_2$-$C_{10}$ aliphatic alcohols.

The plastisols based on vinyl chloride polymers according to the invention generally comprise from 30 to 250 parts by weight of plasticizer(s) per 100 parts of vinyl chloride polymer. Preferably, they contain approximately from 60 to 150 parts by weight thereof, per 100 parts of vinyl chloride polymer.

The plasticizers which can be employed may be chosen from the usual plasticizers for vinyl chloride polymers. By way of examples of usual plasticizers which may be employed there may be mentioned phthalates, adipates, azelates, sebacates, esters of long-chain alcohols, hydrocarbons, chlorinated paraffins and phosphates. One or other of these usual plasticizers will be chosen, depending on the particular properties sought after, in a manner which is known to the specialist. Thus, chlorinated paraffins and phosphates improve nonflammability, fatty acid esters and hydrocarbons reduce viscosity, long-chain phthalates reduce volatility, adipates, azelates and sebacates impart greater low-temperature flexibility, and so on. Preference is generally given to phthalates and, more particularly still, to 2-ethylhexyl phthalate, commonly called dioctyl phthalate (DOP), which offers the best compromise between the various properties.

In addition to the vinyl chloride polymer(s) and to one or more plasticizers, the plastisols according to the invention may contain other ingredients which are usually incorporated in plastisols, such as, for example, stabilizers, fillers, lubricants, pigments, diluents and thickeners.

The manufacture of the plastisols according to the invention does not present any special problem and is carried out in a conventional manner by mixing the ingredients in a simple apparatus of the type of fast mixers with a vertical axis or slow mixers with a planetary movement or with twin horizontal blades, care being taken not to exceed temperatures of the order of 30° C. in order to avoid heating, which would present the risk of producing thickening of the plastisol. It is generally advantageous, furthermore, to predisperse certain solid ingredients, such as stabilizers, fillers, pigments and the like, in the plasticizer employed, in order to ensure their homogeneous distribution in the plastisol.

The plastisols according to the invention adhere perfectly to metal after gelling at 120°–140° C. and are suitable for coating various metal objects with a view to protecting them against corrosion and/or abrasion. They are very particularly suitable for coating sheet metal processed by electrostatic spraying and especially for coating the underneaths of motor vehicles, sometimes referred to as "underbodies" processed by electrostatic spraying, which they protect, in particular against gravel impact.

The use of the plastisols according to the invention for coating sheet metal processed by electrostatic spraying constitutes another aspect of the present invention.

EXAMPLES

The examples which follow illustrate the invention.

Examples 1 to 5 and 7 to 9, according to the invention, relate to the plastisols based on vinyl chloride polymers which are manufactured with the aid of a sulphosuccinamate.

Examples 6 and 10, for comparison, relate to plastisols based on a vinyl chloride polymer manufactured with the aid of an ammonium salt of fatty acid.

Examples 1 and 2 relate more precisely to the plastisols based on vinyl chloride homopolymers (K value measured at 25° C. in cyclohexanone=72) resulting from the aqueous emulsion polymerization at 51° C. with the aid of a redox catalyst system of the ammonium persulphate/copper sulphate type, activated by ascorbic acid.

Examples 3 and 4, 7 and 8, according to the invention relate to the plastisols based on vinyl chloride copolymers (K value=68) containing 5% by weight of vinyl acetate (Example 3), or 5% by weight of 2-ethylhexyl acrylate (Example 4) and resulting from the aqueous emulsion copolymerization at 51° C. with the aid of an activated redox catalyst system identical with that employed in Examples 1 and 2.

Examples 5 and 9, according to the invention, relate to the plastisols based on a vinyl chloride copolymer (K value=68) containing 5% of vinyl acetate and resulting from the aqueous microsuspension copolymerization at 51° C. with the aid of a mixture of oil-soluble initiators of the type of lauroyl peroxide plus dicetyl peroxydicarbonate.

In Example 1, the sulphosuccinamate employed is sodium N-octadecylsulphosuccinamate (general formula I in which $R_1$ denotes an octadecyl radical, $R_2$ hydrogen and M sodium). In Examples 2 to 5 and 7 to 9, sulphosuccinamate employed is sodium N-(1,2-dicarboxyethyl), N-octadecylsulphosuccinamate (general formula I in which $R_1$ denotes an octadecyl radical, $R_2$ a 1,2-dicarboxyethyl radical and M sodium).

Examples 6 and 10, for comparison, relate to the plastisols based on a vinyl chloride homopolymer with a K value equal to 74 and resulting from the aqueous emulsion polymerization at 51° C. with the aid of a redox catalyst system of the ammonium persulphate/copper sulphate type activated by sodium sulphite.

In Examples 1 to 10, the quantity of emulsifier employed was 1 part by weight per 100 parts of monomer(s).

The vinyl chloride polymers manufactured according to Examples 1 to 10 have been isolated from the aqueous polymerization medium, spray-dried and milled so as to produce polymers as particles which have a volume mean diameter of between 10 and 5 μm.

Plastisols were prepared by mixing the ingredients in a rapid mixer according to the formulation A when starting with the vinyl chloride polymers according to Examples 1 to 6 and according to the formulation B when starting with those according to Examples 7 to 10, all the quantities being expressed in parts by weight.

|  | Formulation A | Formulation B |
| --- | --- | --- |
| Vinyl chloride polymer | 100 | 100 |
| 2-Ethylhexyl phthalate | 65 | — |
| Isononyl phthalate | — | 70 |
| Epoxidized soya oil | 5 | — |
| Zinc oxide | 3 | 3 |
| Calcium oxide | — | 5 |
| Polyaminoamide | 1 | 2 |

The resulting plastisols have been applied with the spatula in a thickness of 2 mm between two specimens (20×25 mm) of metal sheet processed by electrostatic spraying (which were supplied by the Peugeot Car Company) and were then gelled for 30 minutes at 140° C. (Examples 1 to 6), or for 30 minutes at 120° C. (Examples 7 to 10). The specimens were then cooled to ambient temperature and left at rest in a constant environment enclosure at 23±2° C. and 50±5% RH for 24 hours (Examples 1 to 6), or for 7 days (Examples 7 to 10). After these periods of time, the adhesiveness of the gelled plastisols was measured by measuring the shear tensile strength (adhesive failure stress) in accordance with Test Method D41 1108 of September 1979, entitled: "Seals Adhesives Compounds Shear Strength" published by the Peugeot and Citroën car companies. The results of the evaluation are given in Tables I and II, appended.

TABLE I

| Example No. | Shear tensile strength MPa (adhesive failure) |
| --- | --- |
| 1 | 2.8 |
| 2 | 2.8 |
| 3 | 3.6 |
| 4 | 2.4 |
| 5 | 3.5 |
| 6 | 0.4 |

TABLE II

| Example No. | Shear tensile strength MPa (adhesive failure = a; cohesive failure = c) |
| --- | --- |
| 7 | 3.5 (a and c) |
| 8 | 3.5 (a and c) |
| 9 | 3.2 (a and c) |
| 10 | 0.7 (a) |

We claim:

1. Plastisols based on vinyl chloride polymers, comprising vinyl chloride polymers resulting from the polymerization of vinyl chloride in aqueous medium with the aid of a sodium sulphosuccinamate of general formula:

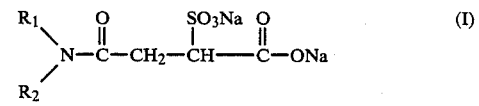

in which:

$R_1$ denotes a $C_{16}$–$C_{20}$ alkyl radical and $R_2$ denotes a sodium 1,2-dicarboxyethyl radical.

2. Plastisols based on vinyl chloride polymers according to claim 1, wherein the vinyl chloride polymers result from aqueous emulsion or microsuspension polymerization.

3. Plastisols based on vinyl chloride polymers according to claim 1, wherein the sulphosuccinamate is employed in a proportion of 0.5 to 3 parts by weight in all per 100 parts by weight of monomer(s).

4. Plastisols based on vinyl chloride polymers according to claim 1, wherein the vinyl chloride polymers are chosen from vinyl chloride homopolymers.

5. Plastisols based on vinyl chloride polymers according to claim 1, wherein the vinyl chloride polymers are chosen from vinyl chloride copolymers containing from 92 to 98% by weight of vinyl chloride, the remainder consisting of vinyl acetate and/or 2-ethylhexyl acrylate.

6. Plastisols based on vinyl chloride polymers according to claim 1, wherein the plastisol has after gelling at about 120°–140° C. an adhesion to metal processed by electrostatic spraying of at least 2 MPa.

* * * * *